United States Patent [19]

Lauck

[11] 4,069,375
[45] Jan. 17, 1978

[54] MANUFACTURE OF GALVANIC ELEMENTS HAVING LITHIUM OR CALCIUM ELECTRODES

[75] Inventor: Helmut Lauck, Glashutten, Germany

[73] Assignee: Varta Batterie Aktiengesellschaft

[21] Appl. No.: 722,112

[22] Filed: Sept. 10, 1976

[30] Foreign Application Priority Data

Oct. 17, 1975 Germany .............................. 2546585

[51] Int. Cl.$^2$ ............................................. H01M 4/58
[52] U.S. Cl. .................................... 429/218; 148/6.3; 427/255

[58] Field of Search ........................ 429/218; 148/6.3; 427/248, 255, 327

[56] References Cited

U.S. PATENT DOCUMENTS

| 3,634,144 | 1/1972 | Hanswalt ............................. 429/218 |
| 4,017,952 | 4/1977 | Nemoto et al. .................... 148/6.3 X |

*Primary Examiner*—Charles F. LeFevour
*Attorney, Agent, or Firm*—Weiser, Stapler & Spivak

[57] ABSTRACT

Lithium- or calcium-electrode elements are manufactured in air by first pretreating the electrode foil with a gas which reacts with the metal foil surface to form a temporary protective layer.

12 Claims, No Drawings

MANUFACTURE OF GALVANIC ELEMENTS HAVING LITHIUM OR CALCIUM ELECTRODES

The invention relates to a method of manufacturing galvanic elements having negative electrodes of lithium or calcium.

The development of lithium cells, particularly, has led to several primary systems ready for production. However, these primary elements have theretofore not found significant use. A principal obstacle to their application on a large scale is their high price which is attributable in large measure to their high manufacturing costs. In comparison with the manufacturing methods used for conventional primary systems, such as zinc manganese dioxide or zinc/mercury oxide, the manufacture of cells with lithium electrodes requires a new technology. Because of the high reactivity of the lithium metal with moist air, the manufacture of lithium cells can only be carried out in a protective gaseous atmosphere, e.g. an atmosphere of argon or in an extremely dry air in drying boxes. This is also true for lithium electrodes for secondary elements, and also for calcium electrodes because this metal is also highly reactive with moist air.

Accordingly, it is an object of the invention to provide a method which makes it possible to produce galvanic elements with lithium or calcium electrodes at lower cost.

It is another object to provide such a method which does not require an atmosphere of protective gas.

It is another object to provide such a method which does not require costly air drying installations.

It is another object to provide such a method which uses air with conventional or only slightly reduced moisture content.

These and other objects which will appear are achieved in accordance with the invention by immersing the electrode metal, before it is made into a galvanic element, in an atmosphere of gas which reacts with the electrode metal and which forms on the metal surface a thin, continuous and non-hygroscopic surface layer.

Particularly well suited for the production of this protective layer are sulfur dioxide and sulfur hexafluoride. Other gases, as for example, carbon dioxide, may also be used. In addition, another gas, e.g., an inert gas such as argon or helium, may be mixed in with the former.

The influence of the gas upon the electrode metal can take place either at room temperature or preferably at an elevated temperature, such as in the temperature range of about 80° C to 169° C. By reaction with the gas, thin non-hygroscopic covering layers are formed on the metal surface. These prevent, for an extended period of time, attack of the metal by moist air, and particularly its darkening through formation of nitrides and oxides. This time interval suffices for the production of the negative electrodes as well as for the assembly of the cells. Cells having flat, plate-like electrodes can be made in the manner described, as well as cells having spiral wrapped electrode.

Since all operations can now be carried out under normal conditions without the use of drying boxes, the manufacturing costs for cells having lithium or calcium electrodes are substantially reduced by virtue of the method embodying the invention.

Cells whose active, negative electrode metal has been treated in the manner described above exhibit a discharge potential at the beginning of discharge which is only slightly (ca. 100 mV) lower than that of cells whose negative electrodes have not been pretreated. After a short discharge period, the covering layer separates from the electrodes and the potential rises to its normal value.

In what follows, the method embodying the invention is further illustrated by examples.

EXAMPLE 1

A piece of lithium foil is removed from the storage container and is heated for eight hours at 140° C in a closed glass vessel filled with a mixture of equal parts of argon and sulfur hexafluoride. Into the bottom of button cell containers, dried positive mass of 96% by weight bismuth trioxide, 3% by weight graphite and 1% by weight polytetrafluorethylene is pressed. Upon the pressed-in $Bi_2O_3$ mass there is placed in each case a separator of a 0.5 mm thick polypropylene matting. Next takes place the addition of the electrolyte solution of 55% by weight dimethoxyethane, 35% by weight propylenecarbonate, and 10% by weight $LiClO_4$ by dripping onto the separators. Out of the lithium foil, discs of appropriate dimensions are stamped after it has cooled, and these are pressed into the nickel expanded metal discs spot welded into the covers of the cell containers. The cells are then closed in conventional manner. Compared with cells which have been manufactured within a box in dry argon and whose negative electrodes have not been pretreated with $SF_6$, the cells manufactured in air in accordance with the method described above display only at the beginning of discharge a potential which is 0.1 volt lower.

EXAMPLE 2

A piece of lithium foil is removed from the storage container and placed into a glass cylinder filled with dry sulfur hexafluoride. After the glass cylinder has been tightly closed, it is heated for six hours in an oven at 130° C. After cooling, the lithium metal is pressed by means of a press into a nickel expanded metal of suitable size and provided with a take-off conductor. A positive electrode made in conventional manner of fluoridated graphite, graphite and binder and then dried, as well as a dried separator, are rolled up together with the negative lithium electrode into a tight spiral which is then inserted into a nickel coated steel container. After spot welding the current take-off conductor to the steel container, or to the cover, the electrolyte (one-molar solution of $LiClO_4$ in propylene carbonate) is inserted into the container from a pipette. The cell is then closed in conventional manner. When loaded with 1 $mA/cm^2$ of electrode surface, the cell potential initially is 2.3 volts. After a discharge period of one hour, the potential rises to 2.45 volts and thereafter remains constant. A comparison cell made with untreated lithium in a drying box has a potential of 2.45 volts at the beginning of discharge, which then also remains constant for an extended period.

EXAMPLE 3

The same as Example 1, except that, for the pretreatment of the lithium metal, sulfur dioxide is used in place of sulfur hexafluoride. The lithium foil is heated in the $SO_2$ atmosphere for three hours at 120° C. Here, too, the voltage reduction at the beginning of discharge amounts to only 0.1 volt.

EXAMPLE 4

The same as Example 2, except that sulfur dioxide is used for the pretreatment of the lithium foil instead of sulfur hexafluoride. The lithium foil is heated in the $SO_2$ containing vessel for six hours at 140° C. Upon discharge of the cell, there will be observed only initially a briefly reduced discharge potential of about 100 mV in comparison with cells made in conventional manner.

EXAMPLE 5

The same as Example 1, except that lithium discs which have already been stamped into their required size in a dry atmosphere are heated in $SF_6$, instead of unprocessed pieces of lithium foil.

EXAMPLE 6

The same as Example 2, except that a calcium foil is used in place of a lithium foil. In this case, the discharge potential is 2.0 volts at the beginning of discharge. After a discharge period of about one hour it rises to 2.2 volts and then reaches the discharge potential of comparison cells which have been manufactured in a drying box without pretreated calcium metal.

EXAMPLE 7

A piece of lithium foil is stored for about 48 hours at 50° C in a closed glass vessel which has been filled with a mixture of carbon dioxide and argon in volumetric relationship of 1:2. After the container with the foil has cooled to room temperature, discs of appropriate size are stamped out of the foil in the air and these are pressed into the cover of high-grade steel, button cell containers. Into the bottom of the cell containers, positive mass tables of about 95% by weight silver arsenite, about 4% by weight graphite and 1% by weight polytetrafluorethylene are pressed. After superposing separators of glass matting, the electrolyte, which is a one-molar solution of $LiClO_4$ in butyrolacton, is inserted into the bottom portions of the cell containers. The cells are closed in conventional manner.

During discharge of the cells, average discharge potentials of 2.6 volts are observed. These therefore correspond in their discharge characteristics to cells manufactured by conventional methods in drying boxes.

I claim:

1. A method of manufacturing electrodes of lithium or calcium metal for galvanic elements, comprising the steps of
    immersing the electrode metal in an atmosphere of gas which reacts with the electrode metal to form upon the metal surface a thin, continuous, non-hygroscopic covering layer, and
    thereafter using the metal in an electrode.
2. The method of claim 1 wherein the gas is sulfur dioxide.
3. The method of claim 1 wherein the gas is sulfur hexafluoride.
4. The method of claim 1 wherein the gas is carbon dioxide.
5. The method of claim 1 wherein the atmosphere includes an inert gas in addition to the gas which forms the covering layer.
6. The method of claim 1, wherein the metal is heated while immersed in the atmosphere.
7. The method of claim 1, wherein the metal is removed from the atmosphere after immersion and before being used in the electrode.
8. The electrode made by the method of claim 1.
9. The method of claim 5, wherein the metal is shaped into the electrode shape in a dry gas before being immersed into the atmosphere.
10. The method of claim 5, wherein the electrode is incorporated into a galvanic element.
11. The method of claim 6, wherein the metal is shaped into the electrode shape after removal from the atmosphere.
12. The method of claim 10, wherein the incorporating is carried out before the covering layer separates from the metal.